United States Patent
Fujita et al.

(10) Patent No.: US 6,954,052 B2
(45) Date of Patent: Oct. 11, 2005

(54) CONTROL APPARATUS AND CONTROL METHOD OF GENERATOR FOR VEHICLE

(75) Inventors: Yoshitomo Fujita, Tokyo (JP); Koichi Yamane, Tokyo (JP); Masami Nakashima, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 53 days.

(21) Appl. No.: 10/705,053

(22) Filed: Nov. 12, 2003

(65) Prior Publication Data

US 2004/0222772 A1 Nov. 11, 2004

(30) Foreign Application Priority Data

May 7, 2003 (JP) ..................................... P2003-129276

(51) Int. Cl.[7] .............................. H02P 7/06; H02P 9/10; H02P 9/14; H02P 9/00; H02J 7/22
(52) U.S. Cl. ............................ 322/28; 322/14; 322/19; 322/25; 322/27; 322/29
(58) Field of Search ............................ 322/14, 19, 25, 322/27–29

(56) References Cited

U.S. PATENT DOCUMENTS

| | | | | |
|---|---|---|---|---|
| 4,608,639 A | * | 8/1986 | Morishita et al. ............. | 701/36 |
| 4,651,081 A | * | 3/1987 | Nishimura et al. ......... | 320/123 |
| 4,689,545 A | * | 8/1987 | Komurasaki et al. ......... | 322/14 |
| 4,739,243 A | * | 4/1988 | Iwatani et al. ................ | 322/10 |
| 5,254,935 A | * | 10/1993 | Vercesi et al. ................ | 322/29 |
| 5,444,354 A | * | 8/1995 | Takahashi et al. ............ | 322/28 |
| 5,448,154 A | * | 9/1995 | Kanke et al. ................. | 322/28 |
| 5,629,606 A | * | 5/1997 | Asada .......................... | 322/28 |
| 5,731,689 A | * | 3/1998 | Sato ............................. | 322/25 |
| 5,767,636 A | * | 6/1998 | Kanazawa et al. .......... | 318/139 |
| 6,184,661 B1 | * | 2/2001 | Becker et al. ................ | 322/25 |
| 6,426,609 B2 | * | 7/2002 | Tanaka et al. ................ | 322/19 |
| 6,456,048 B2 | * | 9/2002 | Taniguchi et al. ............ | 322/28 |

FOREIGN PATENT DOCUMENTS

JP            3-47058 B2     7/1991

* cited by examiner

*Primary Examiner*—Darren Schuberg
*Assistant Examiner*—Pedro J. Cuevas
(74) *Attorney, Agent, or Firm*—Sughrue Mion, PLLC

(57) ABSTRACT

An electronic control apparatus includes target FR calculator that calculates a target exciting current duty ratio FR based on an exciting current inputted from FR terminal of a regulator and flowing through field coil, and information of engine operating conditions. The electronic control apparatus also includes target FR limit value FRCLP calculator that calculates a FRCLP corresponding to a drive torque limit value based on an output of a correlative information detector. A comparator compares target FR and FRCLP, outputs a control signal within FRCLP to a control unit, and controls a duty ratio FR of exciting current flowing through a field coil not to be larger than FRCLP.

7 Claims, 3 Drawing Sheets

CONTROL APPARATUS AND CONTROL METHOD OF GENERATOR FOR VEHICLE

BACKGROUND OF THE INVENTION

1. Field of the Invention

The present invention relates to a control apparatus of a generator for vehicle driven by rotation of an engine and to a control method of the generator.

2. Description of the Related Art

A vehicle such as automobile is generally provided with a generator driven by rotation force of a crankshaft of an engine in order to charge a battery acting as a power source with an electric power. In the case of decrease in battery voltage detected at a voltage detection terminal by a regulator or increase in capacity of an electric load, the generator increases a generated current by making larger a duty ratio of an exciting current inputted to a field coil. On the other hand, in the case of decrease in capacity of the electric load, the generator decreases a generated current by making smaller the duty ratio of the exciting current. Further, upper limit of the duty of the generated current can be set by a control signal inputted from outside. As for the limitation of duty of the exciting current, another method has been proposed. In this another method, a generator itself has a function of limiting the duty of the exciting current to be smaller than a predetermined value at cooling time as disclosed in the Japanese Patent Publication (examined) No.38720/1994 (pages 3–4, FIGS. 1 and 2).

It is a recent trend that various electrical components have been mounted on a vehicle and power consumption has been increased. Under such a background, a high power type generator with high generating performance has been increasingly adopted. In this respect, an output of the generator at cooling time is generally larger than that at heating time which is a nominal output, and drive torque is also larger than that at heating time. The drive torque becomes the largest near the number of revolution when the engine is idling. As a result, in the range of starting a high power type generator mounted on a vehicle at cooling time as well as idling operation, there is a possibility that load on the engine comes to be large, engine speed is reduced, and timing belt is abraded.

As means for suppressing the drive torque of the generator at cooling time, it may be an idea that a generator itself has a function of suppressing a torque, as described above. However, in such a construction, a problem exists in that any additional circuit is required for achieving the suppression in torque, eventually resulting in increase in cost of the generator itself.

SUMMARY OF THE INVENTION

The present invention was made in view of the foregoing problem and has an object of carrying out suppression of torque on the basis of a command from an electronic control apparatus, thereby preventing an engine from reduction in engine speed and preventing a timing belt from abrasion.

A control apparatus of a generator for vehicle according to the invention includes a field coil and controls an output of the generator rotationally driven by an engine by changing duty ratio of an exciting current flowing through the mentioned field coil in conformity with increase or decrease in electric load. This control apparatus includes: means of calculating a target exciting current duty ratio on the basis of a duty ratio of an exciting current flowing through the mentioned field coil and operating condition information of the mentioned engine; means of calculating a target exciting current duty ratio limit value corresponding to a drive torque limit value of the mentioned generator on the basis of an output of correlative information detecting means that detects information correlative to atmosphere temperature of the mentioned generator; and means of limiting a duty ratio of exciting current flowing through the mentioned field coil by limiting a value of the mentioned target exciting current duty ratio on the basis of the mentioned target exciting current duty ratio limit value.

As a result, it is possible to suppress drive torque of the generator at cooling time and prevent engine speed from reduction and a timing belt from abrasion. Even in case of a generator without torque suppressing function, by carrying out the suppression of torque on the basis of a command given from any electronic control apparatus, it is possible to achieve a generator at a cost lower than the generator with a torque suppressing function.

DESCRIPTION OF THE PREFERRED EMBODIMENT

Embodiment 1.

A preferred embodiment of this invention is hereinafter described with reference to the drawings.

Figure 1:
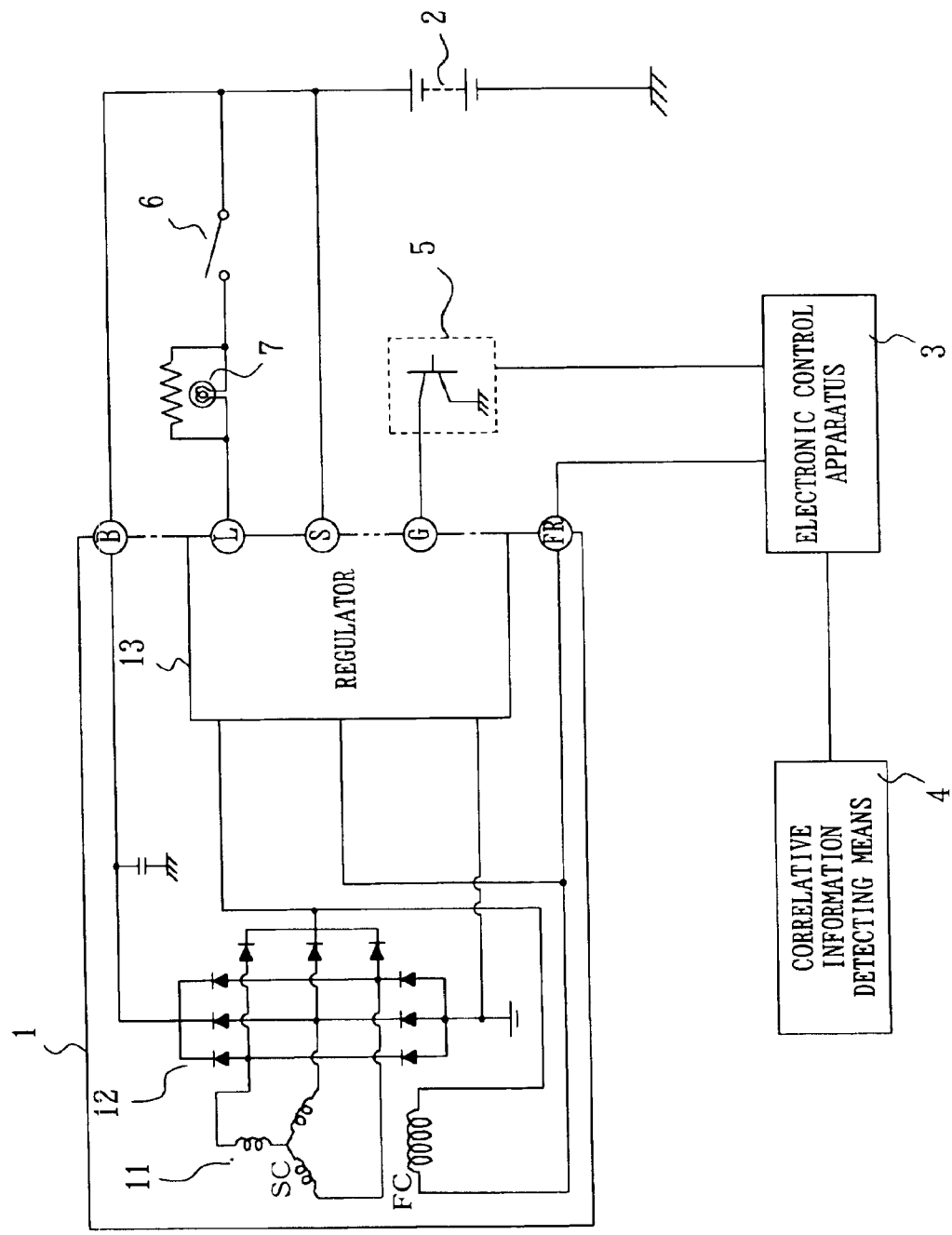
FIG. 1 is a circuit diagram showing a control system of a generator to which this invention is applied.

FIG. 1 is a circuit diagram showing a control system of a generator to which the invention is applied.

With reference to FIG. 1, a generator 1 is mainly comprised of a generating part 11 having a stationary coil SC and a field coil FC, a rectifier 12 formed of a diode, and a regulator 13. Among those elements, the regulator 13 changes a duty ratio of an exciting current flowing through the field coil FC in conformity with voltage of a buttery 2 and an electric load capacity actually used, thus regulating a current value generated by the generating part 11. That is, when the battery voltage decreases or the electric load capacity increases, the regulator 13 increases the duty ratio to increase the generated current and, under the adverse condition, decreases the duty ratio to decrease the generated current. The duty ratio FR of the exciting current flowing through the field coil FC is detected by an electronic control apparatus 3 via a FR terminal. The electronic control apparatus 3 carries out various controls on the basis of information from a correlative information detecting means 4 that detects information correlative to atmosphere temperature of the generator and the operating condition information of the engine and so on. For example, when a G-terminal of the regulator 13 is grounded via a control unit 5 based on a command given by the electronic control apparatus 3, the exciting current flowing through the field coil FC is reduced to zero and the generating current becomes zero. Thus the generating operation is stopped.

Additionally, in the drawing, numeral 6 designates an ignition switch and numeral 7 designates a charge lamp.

Figure 2:
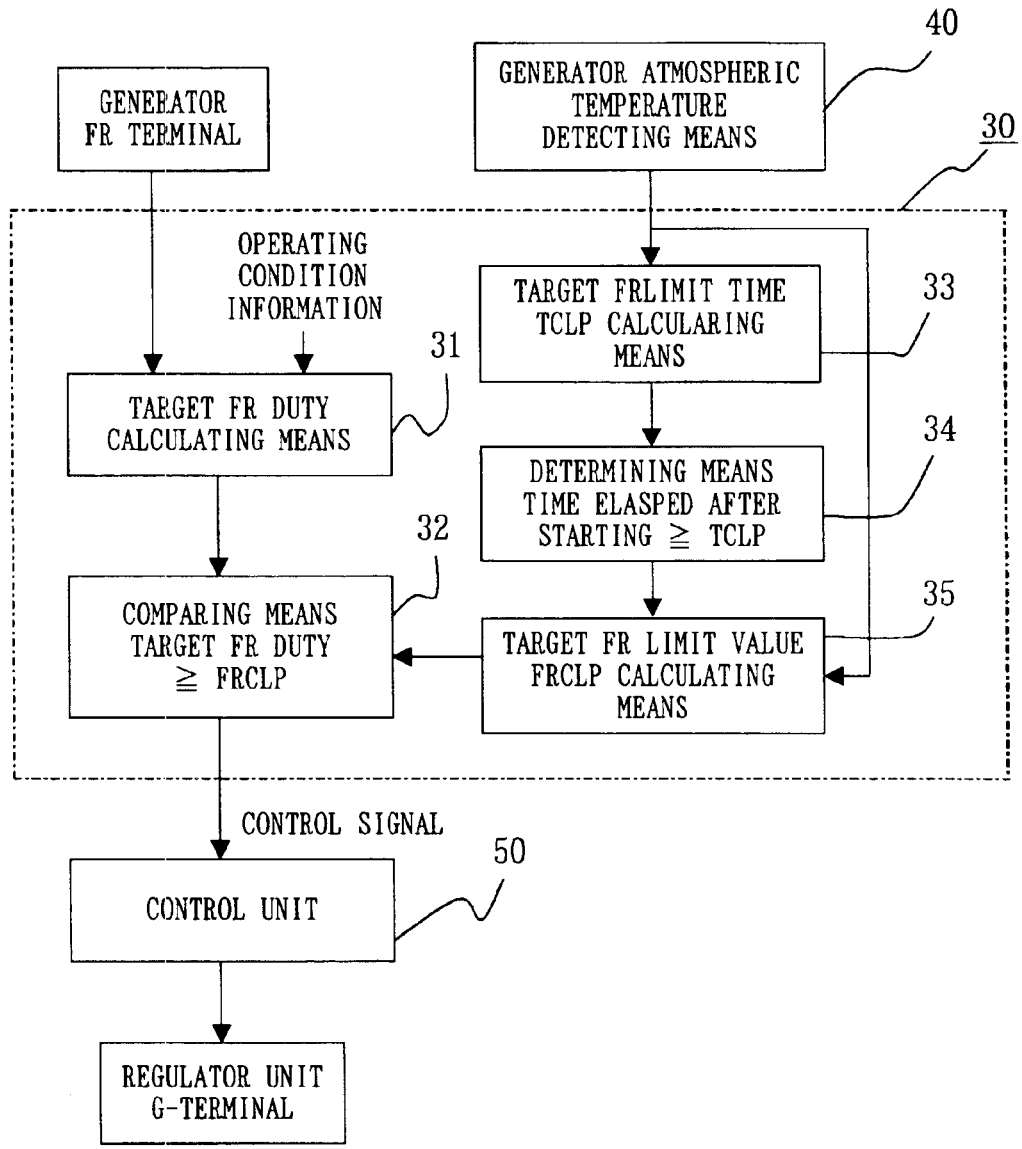
FIG. 2 is a block diagram showing a control apparatus of the generator according to Embodiment 1 of the invention.

FIG. 2 is a block diagram showing a control apparatus of the generator mounted on the electronic control apparatus shown in FIG. 1 according to Embodiment 1 of the invention.

The electronic control apparatus 3 is provided with target FR calculating means 31. This target FR calculating means 31 calculates a target exciting current duty ratio FR on the basis of the exciting current flowing through the field coil FC inputted from the FR terminal of the regulator 13 and operating condition information of the engine.

The electronic control apparatus 3 is also provided with target FR limit value calculating means 35. This target FR limit value calculating means 35 calculates a target FR limit value FRCLP corresponding to the drive torque limit value of the generator 1.

For example, in view of the characteristics of the generator 1, this target FR limit value calculating means 35 can be arranged to include a map in which the target FR limit value FRCLP is set to keep drive torque not to be lower than the nominal output.

Furthermore, the electronic control apparatus 3 compares the target FR with the target FR limit value FRCLP by comparing means 32, outputs a control signal to an control unit 5 within a range not to exceed the target FR limit value FRCLP. Thus, the duty ratio FR of the exciting current flowing through the field coil being controlled not to be larger than the target FR limit value FRCLP.

The electronic control apparatus 3 is further provided with target FR limit time calculating means 33. This target FR limit time calculating means 33 calculates a target FR limit time TCLP that corresponds to a time period for limiting the drive torque of the generator 1 on the basis of the output of the correlative information detecting means 4. Furthermore, correlative information determining means 34 determines whether or not a time elapsed after starting the engine is within the calculated value. When it is determined that the time is within the range of the target FR limit time TCLP, the target FR limit value FRCLP is set as a maximum value (without limit value).

Additionally, in view of the characteristics of the generator 1, the target FR limit time calculating means 33 can be arranged to include a map in which the time for the drive torque to reach the heating time level is set, for example.

Now, with reference to the flowcharts of FIGS. 3 and 4, suppressing control operation of drive torque at cooling time of the generator by means of the electronic control apparatus 3 arranged as described above is hereinafter described.

Such a control operation is carried out within a generating control process. First, in step S1, a target FR is calculated on the basis of the duty ratio FR of the exciting current flowing through the field coil FC measured at the FR terminal and the engine operating conditions being recognized by the electronic control apparatus 3.

In step S2, a target FR limit value calculating process is invoked and the limit value FRCLP is calculated.

Subsequently, in step S3, it is determined whether or not the target FR is not less than the limit value FRCLP (i.e., FR≧FRCLP). When the target FR is not less than the limit value, a process of substituting the limit value FRCLP for the target FR is carried out.

In step S5, a G-terminal duty to be commanded to the regulator 13 is set on the basis of the target FR calculated as described above.

Figure 3:
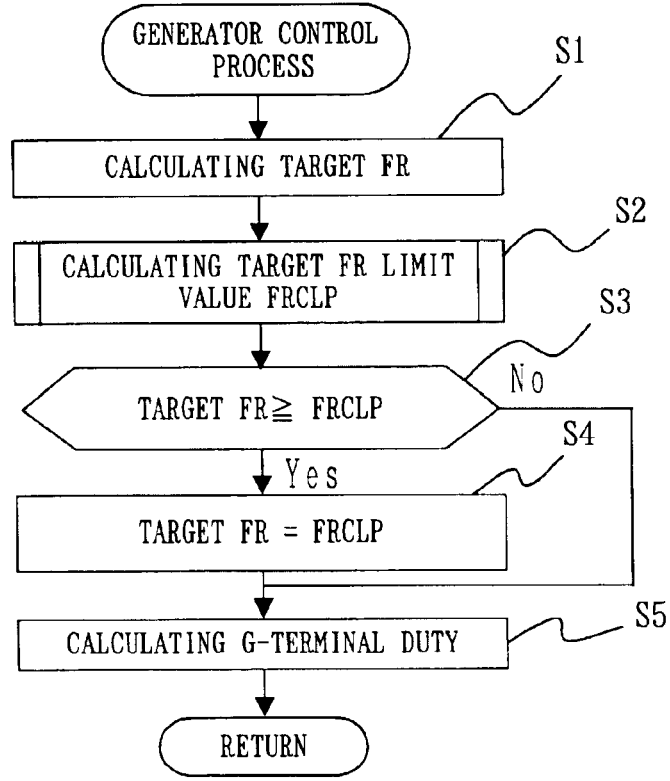
FIG. 3 is a schematic flowchart to explain a control method of the generator according to Embodiment 1 of the invention.
Figure 4:
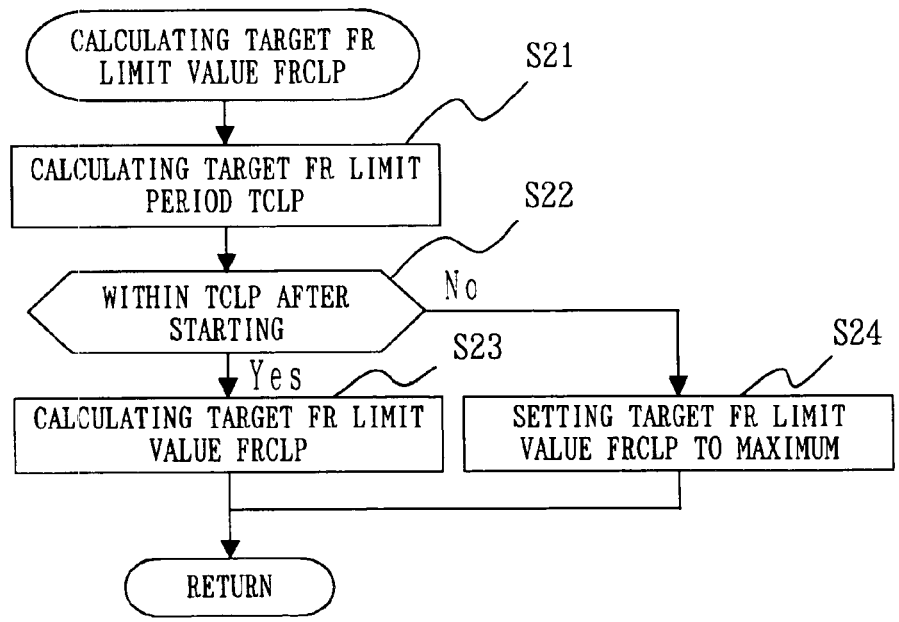
FIG. 4 is a flowchart of an essential part to explain a control method of the generator according to Embodiment 1 of the invention.

FIG. 4 shows a target FR limit value calculating process that is invoked in step S2 of FIG. 3.

Upon invoking this process, first, the target FR limit period TCLP is calculated on the basis of information correlative to the atmosphere temperature of the generator 1 detected at the time of start in step S2. For example, the information includes a map value for setting a time when the drive torque comes to the heating time level on the basis of the water temperature in view of the characteristics of the generator 1.

In step S22, it is determined whether or not the time elapsed after starting is within the target FR limit period TCLP. When the elapsed time is within the TCLP, a process of next step S23 is carried on. When not, the target FR limit value FCLP of step 24 is set to a maximum value (without limit value).

In step 23, the target FR limit value FRCLP is calculated from a map value, for example, which sets the drive torque not to be lower than the nominal output on the basis of the detected water temperature in view of the characteristics of the generator 1.

In the embodiment above described, the target FR limit period TCLP and the target FR limit value FRCLP are calculated on the basis of water temperature information correlative to the atmosphere temperature of the generator 1. Furthermore, it is also preferable to use any other information correlative to the temperature of the generator, such as outside air temperature, temperature difference between water and outside air, the temperature of the generator itself.

What is claimed is:

1. A control apparatus of a generator for vehicle that includes a field coil and controls an output of the generator rotationally driven by an engine by changing duty ratio of an exciting current flowing through said field coil in conformity with increase or decrease in electric load:

said control apparatus comprising:

means of calculating a target exciting current duty ratio on the basis of a duty ratio of an exciting current flowing through said field coil and operating condition information of said engine;

means of calculating a target exciting current duty ratio limit value corresponding to a drive torque limit value of said generator on the basis of an output of correlative information detecting means that detects information correlative to atmosphere temperature of said generator; and means of limiting a duty ratio of exciting current flowing through said field coil by limiting a value of said target exciting current duty ratio on the basis of said target exciting current duty ratio limit value.

2. The control apparatus of a generator for vehicle according to claim 1, further comprising means of calculating target exciting current duty ratio limit time that corresponds to period for limiting drive torque of said generator, wherein said exciting current duty ratio is limited within said calculated target exciting current duty ratio limit time.

3. The control apparatus of a generator for vehicle according to claim 2, wherein said means of calculating target exciting current duty ratio limit time sets a time at which said drive torque comes to a heating time level on the basis of the characteristics of said generator.

4. The control apparatus of a generator for vehicle according to claim 2, further comprising means of determining whether or not a time elapsed after starting said engine is within said target exciting current duty ratio limit time, wherein said target exciting current duty ratio limit value is calculated on condition that said elapsed time is within said target exciting current duty ratio limit time.

5. The control apparatus of a generator for vehicle according to claim 1, wherein said means of calculating target exciting current duty ratio limit value sets a target exciting current duty ratio limit value so as to obtain a drive torque not being lower than the nominal output on the basis of characteristics of said generator.

6. A control method of a generator for vehicle that includes a field coil and controls an output of the generator rotationally driven by an engine by changing duty ratio of an exciting current flowing through said field coil in conformity with increase or decrease in electric load:

said control method comprising the steps of:

calculating a target exciting current duty ratio on the basis of a duty ratio of an exciting current flowing through said field coil and operating condition information of said engine;

calculating a target exciting current duty ratio limit value corresponding to a drive torque limit value of said generator on the basis of an output of correlative information detecting means that detects information correlative to atmosphere temperature of said generator; and limiting a duty ratio of exciting current flowing through said field coil by limiting a value of said target exciting current duty ratio on the basis of said target exciting current duty ratio limit value.

7. The control method of a generator for vehicle according to claim 6, further comprising a step of calculating a target exciting current duty ratio limit time corresponding to the period for limiting the drive torque of said generator, wherein said exciting current duty ratio is limited within said calculated target exciting current duty ratio limit time.

\* \* \* \* \*